United States Patent

[11] 3,622,883

[72] Inventor Kenneth E. Haire
 Poughkeepsie, N.Y.
[21] Appl. No. 870,839
[22] Filed July 24, 1969
[45] Patented Nov. 23, 1971
[73] Assignee International Business Machines Corporation
 Armonk, N.Y.
 Original application Aug. 18, 1965, Ser. No. 538,858, now Patent No. 3,471,770. Divided and this application July 24, 1969, Ser. No. 870,839

[54] PULSED CURRENT TRANSISTOR BETA TESTER HAVING FEEDBACK TO MAINTAIN EMITTER TO COLLECTOR CURRENT CONSTANT
 8 Claims, 7 Drawing Figs.
[52] U.S. Cl. ............................................. 324/158 T
[51] Int. Cl. ................................................ G01r 31/22
[50] Field of Search ........................................ 324/158, 158 T

[56] References Cited
OTHER REFERENCES

Electronic Design; Vol., 11; No., 17; August 16, 1963; pp. 96 and 98; copy in 324– 158.

Siconolfi; J. R.; How to Measure...; EEE; Sept. 1965; pages 79, 80; copy in 324– 158.

Continental Device Corporation; data sheet for pulsed/DC Common Base Test System; Type 9503-3; March 1, 1966; pages 1 and 2; copy in 324– 158.

*Primary Examiner*—Rudolph V. Rolinec
*Assistant Examiner*—Ernest F. Karisen
*Attorneys*—Hanifin and Jancin and Henry Powers CLAIM: A test circuit for measuring forward current gain of a transistor comprising:
a plurality of output test terminals for connection to the collector, emitter and base of said transistor;
a first, drive, amplifier having input and output terminals;
a resistor connected in series between the output of said first amplifier and a first of said test terminals;
a first referenced potential connected to a first input of said first amplifier;
a second of said test terminals connected to a second input of said first amplifier;
a constant current generator having at least two output terminals with one generator output terminal connected to the said second test terminal and with a second generator output terminal connected to a third of said test terminals, with said second and third test terminals being adapted for connection across the emitter and collector of said transistor, and with said first test terminal being adapted for connection to the base of said transistor;
a feedback path coupled from the said first test terminal to said second test terminal and comprising:
a second differential, amplifier having inputs connected across said resistor;
and means including a third inverting, amplifier having the output thereof connected to the output of said second amplifier, and with an input of said third amplifier connected to said second test terminal for applying a feedback signal to said second test terminal.

3,622,883

PULSED CURRENT TRANSISTOR BETA TESTER HAVING FEEDBACK TO MAINTAIN EMITTER TO COLLECTOR CURRENT CONSTANT

This application is a division of copending application Ser. No. 538,858, now Pat. No. 3,471,770, filed Aug. 18, 1965.

This invention relates to pulse current generating circuits, and more particularly this invention relates to constant current pulse generators useful in test circuits for measurement of current gain and other characteristics of electron transfer devices such as transistors and the like.

Pulse generating circuits have been found to be valuable in semiconductor testing. A pulse signal does not affect the semiconductor parameters which are temperature dependent. The short test pulse produces considerably less power loss and hence temperature rise than the continuous test signals generally employed on the semiconductor testing art. One problem in pulse generating circuits is the provision of a constant current pulse source which is necessary for precise measurement of semiconductor transfer characteristic. Another problem is the provision of a programmable constant current source which may be readily altered to desired preselected values so as to enable the testing of a wide variety of semiconductor devices.

Accordingly, a general object of this invention is an improved pulse generator for providing a programmable constant current useful, in form, for transfer test circuits.

Another object is a constant current pulse generator which is substantially insensitive to oscillations caused by interaction between the generator and a load, the generator being independent of any nonlinear characteristics of components therein.

A further object is a pulse generator which can be used with a novel test circuit for the measurement of current gain and other characteristics of electron transfer devices.

A still further object is a novel test-circuit having a high degree of inherent system stability for the measurement of characteristics of electron transfer devices.

The pulse generator disclosed herein produces a constant current pulse whose amplitude can be accurately controlled with reference to a preselectable voltage reference source. This pulse generator is substantially insensitive to oscillations caused by interactions between the generator and the load, and whose accuracy is independent of any nonlinear characteristics of its components. The additional advantage of the very fast response of this pulse generator in the microsecond region, makes it very useful for many applications, as for example, for the measurement of current gain and other characteristics of electron transfer devices such as transistors and the like.

A conjoint feature of this invention is the use of such a pulse generator in conjunction with a special test circuit, disclosed herein, which embodies a high degree of inherent system stability for the testing of the indicated electron transfer devices.

The foregoing and other objects, features and advantages of this invention will be apparent from the following more particular description of a preferred embodiment of the invention, as illustrated in the accompanying drawings in which.

Figure 1:
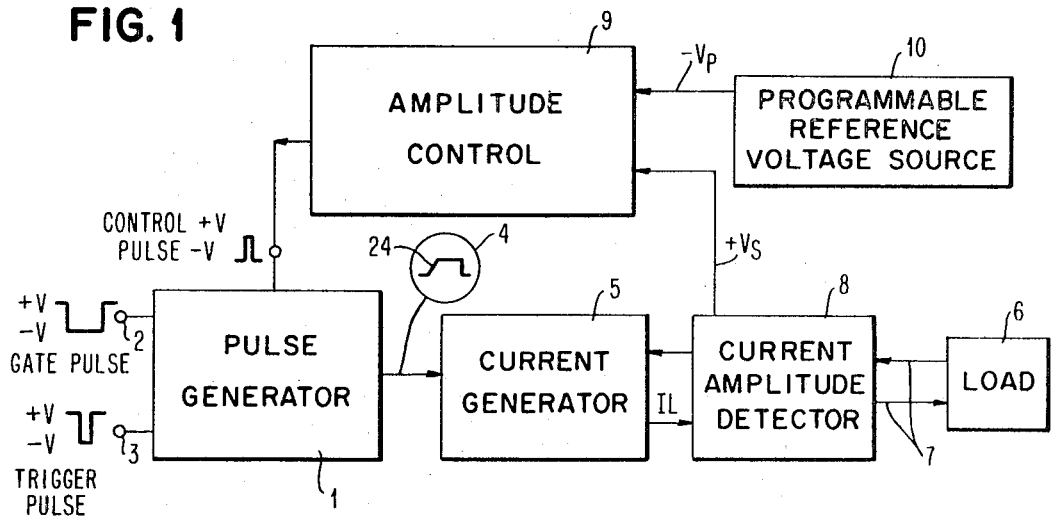
FIG. 1 is a block diagram of a circuit of this invention.

Generally speaking, the invention comprises, with reference to FIG. 1, a pulse generator 1 having an input terminal 2 to which is applied a gate pulse to activate the pulse generator and a delayed second width short pulsed signal to initiate a current waveform 4 whose pulse width is determined by the remaining period of the gate pulse. Both of the gate and trigger pulses are of the type conveniently employed for various application wherein the pulses may alternate between negative and positive excursions from a base line wherein the signal to the pulse generator is applied during the negative excursions of the pulse. As will be apparent, control of the external sources of the gate and trigger pulse may be employed to program any desired generated waveform pulse width and duty cycle to the pulse generator. In general, the pulse width of the generated waveform may be controlled by selected programming of the pulse width of the gate pulse ($t_1-t_1$ FIG. 3), and after a delay ($t_1-t_2$), of the smaller pulse width trigger signal ($t_2-t_4$). In similar fashion, the duty cycle of the generator can be controlled by like programming of the frequency of the negative excursions of the gate pulse. Normally, the generator will be employed at a pulse width of $300\mu \pm 30\mu$ with a duty cycle of $\leq 2$ percent.

The output waveform 4 from pulse generator 1 is passed to a current generator 5 which produces a current waveform $1_L$ which is directly proportional to the waveform output 4 of pulse generator 1. This current $I_L$ from current generator 5 to a load in the output path 7 is sensed in magnitude by a current magnitude detector 8 where it is converted to a potential $V_s$ and fed to the amplitude control 9 where it is compared to the potential $V_P$ of a programmable reference voltage source 10. At some time when the potential $V_s$ of amplitude detector 8 has increased to the value of the reference potential $V_p$, the amplitude control 9 will generate a control pulse ($t_3-t_5$), having a very fast rise time, to fix the amplitude of the voltage waveform 4 (generated at this time) for the duration of the gate pulse and, thus, concurrently fixing the amplitude of the current $I_L$ of current generator 5 and thus maintaining a fixed constant current at the load 6.

Figure 2:
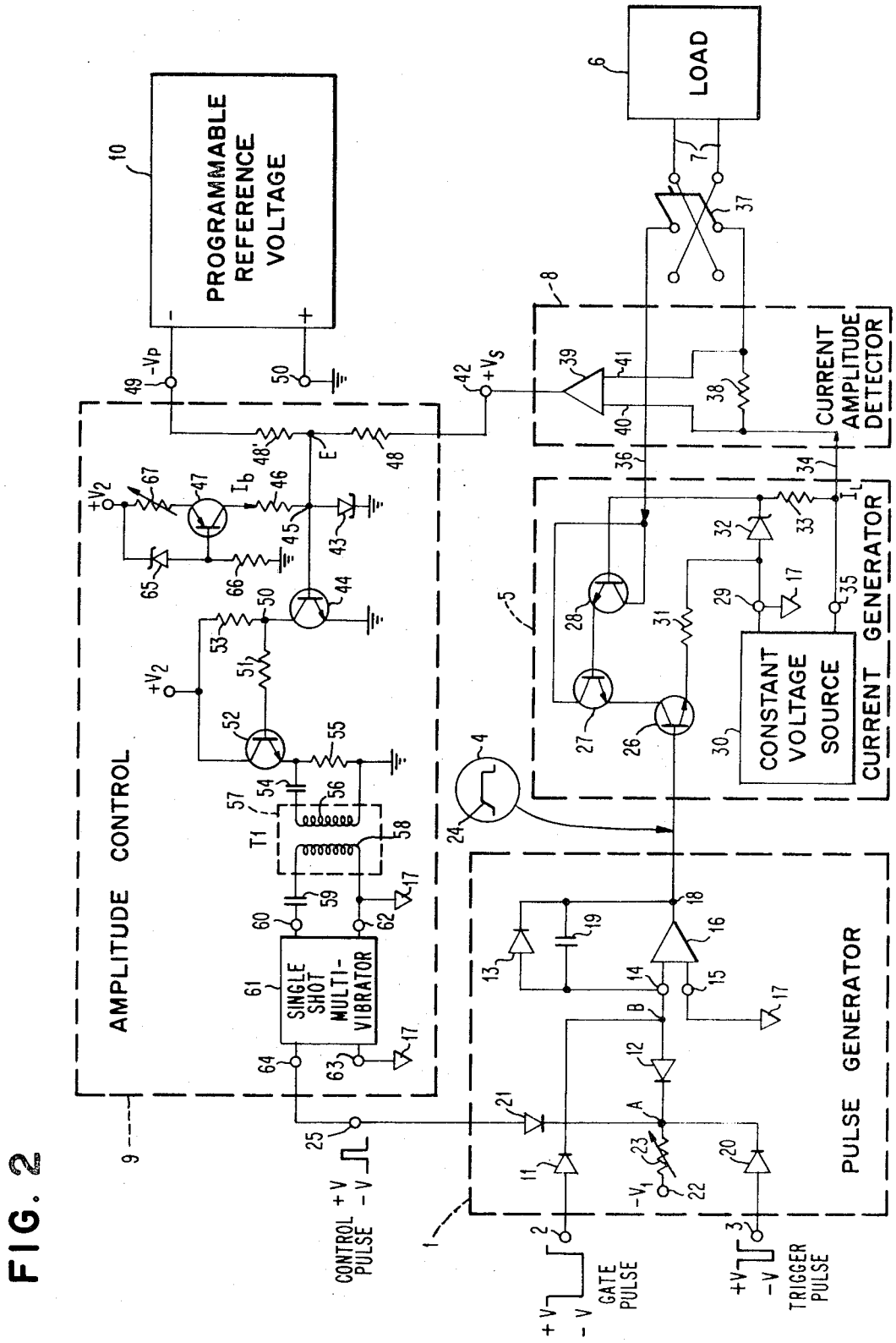
FIG. 2 is a detailed electrical schematic circuit of one embodiment of the pulse generator of this invention.

More specifically, referring to FIG. 2, the pulse generator 1, includes a diode 11 whose anode is connected to the input terminal 2 to which a preset gating pulse is applied. The cathode of diode 11 is connected in common to the anodes of a pair of diodes 12 and 13, and to an input terminal 14 of an amplifier 16 having a second input terminal 15 connected to an output terminal 18 of the amplifier 16 which generates the indicated voltage waveform 4. A capacitor 19 is also connected across the amplifier terminals 14 and 18 in parallel circuit with diode 13. It is to be understood that all amplifiers which are mentioned herein, including amplifier 16 are conventional operational type amplifiers, and are shown as such by conventional symbols in the drawing. A typical amplifier for use in generating such a voltage waveform 4 is the commercial model P45A of the Philbrick Research, Inc., Boston, Mass.

Figure 2A:
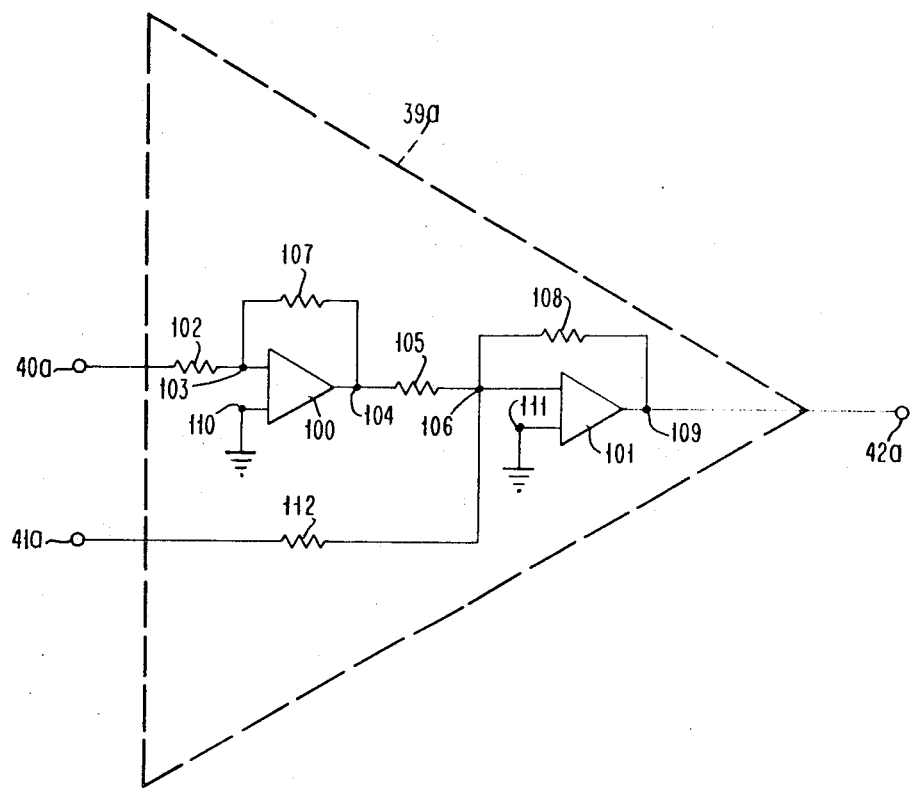
FIG. 2a illustrates a modification in electrical schematic form to the circuit of FIG. 2.
Figure 2B:
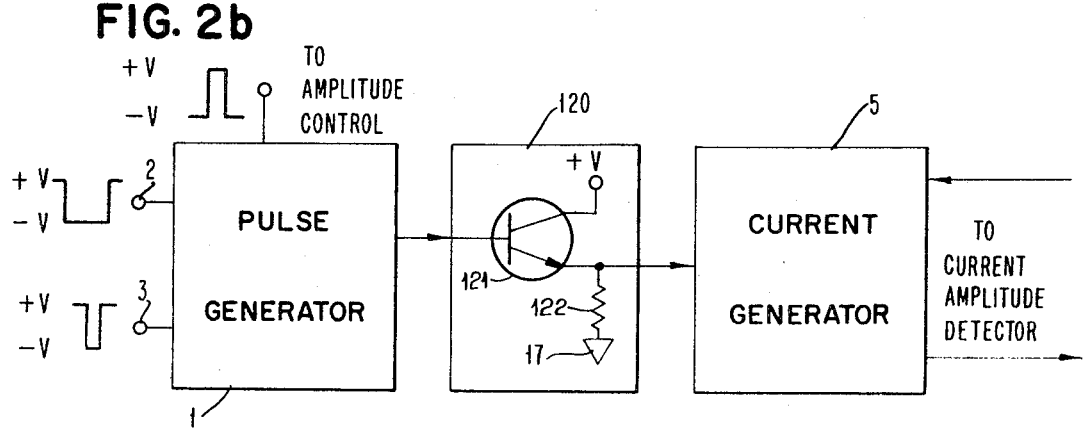
FIG. 2b illustrates in electrical schematic form, another modification of the pulse generator of this invention.

The other side or cathode of diode 12 is connected in common with the cathodes of a pair of diodes 20 and 21, and to a source of negative potential, $-V_p$ at terminal 22, through a variable resistor 23 whose setting will determine the rate of rise of the voltage waveform 4's leading edge ramp 24. The anode of diode 20 is in turn connected to the terminal 3 to which the preset trigger pulse is applied. The circuit of the pulse generator is completed by connection of the anode of diode 21 to a terminal 25 where the pulse generator circuit will be functionally connected to the amplitude control 9.

Where desired, the aforedescribed portion circuit of the pulse generator 1 can be readily modified as shown in FIG. 2b to accommodate an amplifier 16 having a low output impedance. In such event, it is only necessary to insert an output amplifier 120 between the output of the pulse generator 1 and the input of the current generator 5. In its simplest form, such an amplifier 120 can comprise an NPN transistor 121 having its base connected to the output of amplifier 16, and its collector connected to the positive potential +V. The circuit is continued by a common connection of the emitter of transistor 121 to be base of transistor 26, in the current generator 51 and through resistor 122 to common reference 17.

The current generator 5 includes an NPN transistor 26 in cascode arrangement with an NPN transistor 27 which in turn is connected in a Darlington circuit with an NPN transistor 28. The current generator 5 is integrated with the pulse generator 1 by electrical connection between the output terminal 18 of amplifier 16, and the base of transistor 26 whose emitter is connected in common to the reference potential 17 and the negative terminal 29, of a constant voltage source 30, through a resistor 31. The collector of transistor 26 is connected to the emitter of transistor 27 whose base is connected in turn to the emitter of transistor 28. The base of transistor 28 is connected in common with the cathode of a zener diode 32 and one side of a resistor 33 whose other side is connected to the output path 34 emanating from the positive terminal 35 of constant voltage source 30. The return path 36 of the generator is connected in common to the collectors of the transistor 27 and 28. If desired, the output and return paths 34 and 36 may be connected across the load 6 through a reversing switch 37 for directional control of current polarity.

The current amplitude detector comprises a resistor 38 inserted in the output path 34, and a differential amplifier 39 having inputs 40 and 41 connected across the resistor 38. The output of the amplifier 39 is connected to a terminal 42 where it is functionally integrated with the amplitude control 9.

Optionally, as shown in the modification of FIG. 2a, the differential amplifier 39, can be substituted by the composite amplifier 39a which may comprise a plurality of amplifiers 100 and 101 such as the Philbrick Research, Inc. amplifier model P45A indicated above. Such a composite amplifier 39a will include composite input 40a and 41a and a composite output 42a corresponding, respectively, to inputs 40 and 41 and the output 42 of amplifier 39 with the composite inputs 40a and 41a similarly connected across the resistor 38, in the output of current generator 5. Composite input 40a is connected through a resistor 102 to an input 103 of amplifier 100 whose output 104 is connected through resistor 105 to an input 106 of the amplifier 101. The input 106 of amplifier 101 will also be connected to composite input 41a through a resistor 112. A resistor 107 is shunted across the input 103 and output 104 of amplifier 100, and, similarly a resistor 108 is shunted across input 106 and output 109 of amplifier 101 which is also connected to the composite output 42a. Each of the second inputs 110 and 111 of, respectively, amplifiers 100 and 101 is connected to ground.

The amplitude control 9 includes a tunnel diode 43 having its cathode connected to ground and its anode connected in common, at point 45, with the base of an NPN transistor 44 and through a resistor 46 to the collector of a PNP transistor 47. The anode of the tunnel diode 43 is also connected at point 45 to the juncture of a connected like pair of resistors 48 and 48'. The other side of resistor 48 is connected to terminal 42 to functionally integrate the amplitude control 9 with the current amplitude detector 8, and the other side of resistor 48' is connected to the negative terminal 49 of a programmable reference voltage source 10, having its positive terminal 50 grounded. Any suitable programmable reference voltage source may be employed which enables the preselection of a reference potential, as for example, the model TR 0–18 unit of the Electronic Measurement Corp., Eaton Town, Pa.

Returning to the amplitude control 9, its indicated transistor 44 has its emitter connected to ground, and is collector connected at junction point 50 through a resistor 51 to the base of an NPN transistor 52 and through a resistor 53 to a positive potential $+V_2$ which is also applied to the collector of the transistor 52. The emitter of transistor 52 is connected to the juncture of a condenser 54 and a resistor 55 which are connected in series circuit across the primary winding 56 of a transformer 57 with the common junction of resistor 55 and primary winding 56 connected to ground.

One side of the secondary winding 58, of transformer 51, is connected through a condenser 59 to an input terminal 60 of a one-shot multivibrator 61; and the other side of the secondary winding 58 is connected in common with the common reference source 17 and a secondary input terminal 62 of the multivibrator 61. One output terminal 63 of the multivibrator 61 is connected to common reference 17 and its other output terminal 64 is connected to the pulse generator output terminal 25 for functional integration therewith. A typical one-shot multivibrator for use in the amplitude control 9 is the Direct Coupled Silicon Monostable Multivibrator Circuit 6–16 on page 6–59 of the Department of Defense "Military Standardization Handbook of Selected Semiconductor Circuits," Mil-HDBK–215, June 15, 1960.

The amplitude control 9 also includes a zener diode 65 whose cathode is connected to the source of positive potential $+V_2$, with the anode of the zener diode 65 connected to the base of transistor 47 which is grounded through a resistor 66. The source of positive potential $+V_2$ also connected to the emitter of transistor 47 through a variable resistor 67 for adjustment of the amplitude control 9 so that the multivibrator will produce the desired control signal when the $+V_S$ potential from the output of amplifier 39 becomes equal to the $-V_P$ potential of the programmable reference voltage source 10.

Figure 3:
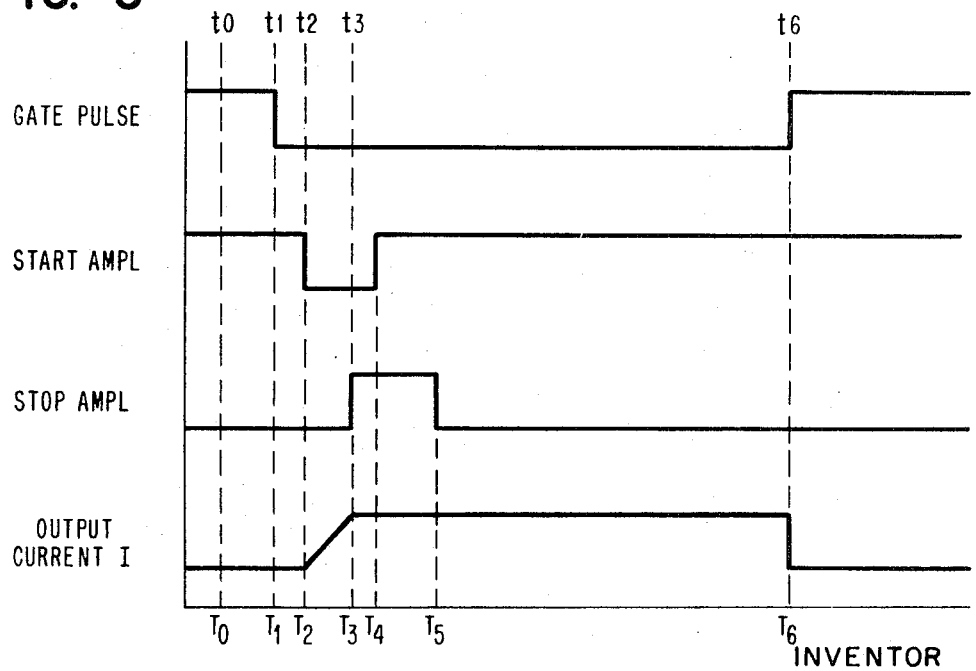
FIG. 3 depicts waveforms to show the amplitude time relationship of various signals which may be employed in the generator.

The operation of the circuit of FIG. 2 with reference to the timing diagram of FIG. 3, is as follows: At time $t_o$, with the gate pulse at $+V$, diode 11 and 13 both conduct and clamp the output of the pulse generator amplifier 16 slightly below common. This reverse biases transistor 26 and no current will flow from the current generator 5.

Also at $t_o$, with the trigger pulse at $+V$, diode 20 will conduct and raises Point "A" above common to approximately the $+V$ reverse biasing diodes 12 and 21. Point "B" will be held near common by amplifier 16 to reverse bias and also cutoff diode 12. With no $I_L$ current in the output path 34, the output of amplifier 39 is also zero, and Point "E" will therefore be negative with respect to ground because of the $-V_P$ of the programmable reference voltage source 10. As a result tunnel diode 43 and transistor 44 will be reverse biased, and the bias current $I_B$ will flow from transistor 47 to Point "E." This bias current $I_B$ is adjusted by variable resistor 67 so that when the positive potential $+V_S$ from the output of amplifier 39 to Point "E" equals the magnitude of the negative potential $-V_P$, of the reference voltage source 10, the tunnel diode 43 will switch through its negative resistance region to suddenly turn on transistor 44, which will occur at $t_3$. From time $t_o$ to $t_3$ transistor 52 will be forward biased to maintain capacitor 54 charged. While transistor 52 is conducting, the multivibrator 61 will be passive, and its output terminal maintained at a negative potential.

At time $t_1$, the negative excursion of a gate pulse, having a pulse width $t_1$–$t_6$ will shift the potential at input terminal 2 from $+V$ to $-V$ and reverse bias diode 11 to end the forward current through diode 13.

At time $t_2$, the negative excursion of the trigger pulse, having a short pulse width of $t_2$–$t_4$, will shift the potential at input terminal 3 from $+V$ to $-V$, and thus reverse bias diode 20. As a result, diode 20 will be cutoff; and diode 12 will conduct a constant current from the output of amplifier 16 through condenser 19 and variable resistor 23 to the negative potential at terminal 22. This causes the output voltage waveform 4 of amplifier 16 to rise in a linear ramp whose rate of rise is determined by adjustment of variable resistor 23.

Transistor 26 and resistor 31 form a voltage follower and follow the generated ramp waveform 4 of amplifier 16. Zener diode 32 holds the base of transistor 28 at a constant potential; and as the collector of transistor 26 falls toward the ramp voltage, transistors 27 and 28 turn on also. The result is that the voltage of the constant voltage course 30 is divided between the resistor 38, (of detector 8), the load 6, and the drop from the collector of transistor 28 to the common reference 17. The voltage drop produced across the load 6 produces a current waveform "$I_L$" in output path 34 exactly like the voltage waveform 4 output of amplifier 16. This current is sensed in magnitude by the differential amplifier 39 connected across resistor 38 by its input 40 and 41. The output signal of amplifier 39 is fed to the amplitude control 9 as a $+V_S$ which is impressed through its resistor 48 at Point "E."

At some time $t_3$, as the $+V_S$ output potential from amplifier 39, which is impressed at Point "E," equals the $-V_P$ potential of the reference voltage source 10; which is impressed at Point "E," the bias current $I_B$ from transistor 47 will switch tunnel diode 43 and turn on transistor 44 very quickly. As a result, transistor 52 will turn off, and the negative pulse at the emitter of transistor 52 will be coupled through transformer 57 to the multivibrator 61. The output of multivibrator 61, through input 25 to diode 21, is a stop-amplitude control pulse shifting from a negative $-V$ potential to a positive $+V$ potential. As a result, diode 21 will conduct and raise the potential at point "A" to approximately $+V$ again, and will thus cutoff diode 12. Condenser 19 will hold its charge for the remaining duration of the gate pulse, because of the high impedances of amplifier 16 and diodes 11, 12 and 13. The result is that transistor 26 will be biased at a steady value, and the $I_L$ will be constant.

At time $t_6$, when the gate pulse will return to its $+V$ potential, diode 11 will be forward biased which will quickly discharge condenser 19 and forward bias diode 13. As a result, the output of amplifier 16 will fall slightly below common, and thus cutting of transistor 26 to end $I_L$ in output path 34.

In summary, a pulse generator 1 provides an input signal to a current generator 5. The output of current generator 5 to a load 6 is sensed by the current amplitude detector 8 which provide an operating signal $+V_S$ to the amplitude control 9 wherein it compared to a reference control of reference voltage source 10 and the amplitude control 9 then programs an output control signal to the pulse generator 1. When the pulse generator is activated in response to a plurality of correlated input pulses, a ramped output signal is provided to the current generator 5 to provide a directly proportional ramped current output. The current amplitude detector 8 senses the output of current generator 5 to provide an operational signal output to the amplitude control 9 in conjunction with the comparative reference potential of the reference voltage source 10. As the output of the current amplitude detector equals the reference potential of voltage source 10, the amplitude control 9 is activated to provide a stop control pulse to the pulse generator 1. The pulse generator will then lock up to enable the current generator to provide a constant current to the load.

In view of the little capacitance embodied in the circuit of the constant current pulse generator of this invention, it will respond in the microsecond region or better, and its output impedance is high (e.g. slightly less than collector resistance Rc, of transistor 27). Also, since tunnel diode 43 is normally reverse biased, there is little chance of random noise causing transistor 44 to switch on prematurely so as to generate a stop amplitude control pulse. Further, in the absence of a negative excursion of the gate pulse, noise or shifts in supply voltages cannot accidentally produce a current pulse. In general, the constant current pulse generator of this invention is not susceptible to oscillations caused by interaction between the generator and the load. Accuracy of the pulsed current generated is independent of any nonlinear characteristics of the current generator 5. The invention also provides a constant current pulse generator which can be operated with a remotely programmable current pulse magnitude, current pulse width and duty cycle. In sum, the magnitude of the current to be generated is limited only by the power and current rating of the transistors of current generator 5 and the ability of the constant voltage source to deliver the current instantaneously and for the duration of its pulse. Secondly, the response of the constant current pulse generator, of this invention, to changes in load impedance is limited only by the frequency response of the transistors of current generator 5. Thus, once the current level has been set by the feedback circuit to the pulse generator 1, the response to a sudden change in load impedance will be as fast as the current generator transistors 27 and 28 can react to the change and hold the current constant. In general, this response can be determined by the transistors selected and used. Finally the magnitude of the compliance voltage available to the load is limited only by the breakdown voltage rating of the transistors of the current generator 5, and that which the voltage source can deliver.

Figure 4:
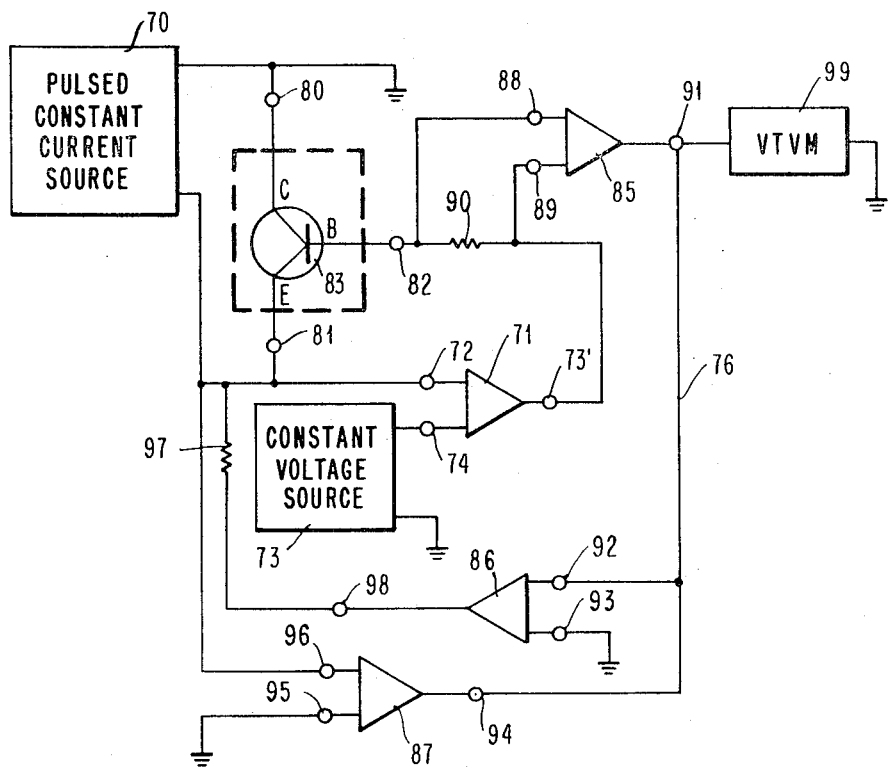
FIG. 4 is an electrical circuit diagram of one embodiment of a test circuit included in the invention.

As indicated above, FIG. 4 provides a novel and special testing circuit which can be employed with advantages with the above described constant current pulse generator for measuring the forward current transfer ratio $H_{FE}$, of transistors, As shown in FIG. 4, the test circuit comprises a plurality of output test terminals 80, 81 and 82 with test terminals 80 and 81 connected across a pulsed constant current source 70, as for example, the above described constant current pulse generator of this invention. The test terminal 80 will also be connected to ground. Also, test terminal 81 will be connected to an input terminal 72 of a drive amplifier 71, having its output terminal 73 connected to test terminal 82. A second input terminal 74 of the drive amplifier 71 is connected to an input of a constant voltage source 75, connected at its other side to ground.

In accordance with one important aspect of this special circuit design, a feedback path 76 is coupled from the test terminal 82 to test terminal 81 for return of current from test terminal 82 to test terminal 81 whereby the current at test terminal 80 will be specified by the pulse constant current source 70. Such a design has great advantages, for example, in the measurement of current gain of a test transistor 83 wherein $V_{CE}$ and $I_C$ can be as specified. Such a test is made by having the test transistor's collector, emitter and base mounted, respectively, at test terminals 80, 81 and 82. In this manner, the test transistor 83 is employed as a noninverting current amplifier in the feedback of the drive amplifier 71. Thus, by proper modification of the feedback loop 76, the base current $I_B$ of the test transistor 83 can be returned to the test terminal 81 whereby the current at test terminal 80 becomes specified by the pulsed constant current source 70.

Such a modification of the feedback loop 76 can be effected by the inclusion therein of a differential amplifier 85, a summing amplifier 86 and an inverting amplifier 87. Differential amplifier 85 is incorporated into the feedback path 76, by connection of its input terminals 88 and 89, across a resistor 90 inserted in series circuit between the test terminal 82 and the output terminal 73 of the drive amplifier 71. The output terminal 91 of differential amplifier 85 is connected to an input terminal 92 of summing amplifier 86 having a second input terminal 93 connected to ground. The input terminal 92 of summing amplifier 86 is also connected to an output terminal 94 of the inverting amplifier 87 which has two input terminals 95 and 96 connected, respectively, between ground and test terminal 81. The feedback loop 76 is completed by a resistor 97 connected on one side to test terminal 81, and on its other side to the output terminal 98 of the summing amplifier 86. The value of the test current at test terminal 82 can be measured by a meter 99 connected across ground and output terminal 91 of differential amplifier 85. If desired, the meter can be calibrated directly in terms of $I_B$ or $H_{FE}$ current gain.

Figure 5:
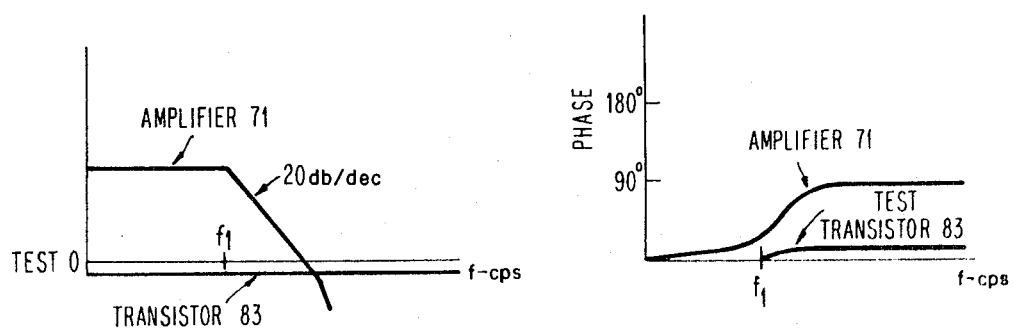
FIG. 5 is a Bode Plot for the test circuit of FIG. 4.

In operation for measuring the $H_{FE}$ current gain of transistors, a test transistor 83 is place in the circuit by connection of its collector, emitter and base to respectively, test terminals 80, 81 and 82. In this manner, the test transistor 83 is employed as a noninverting current amplifier in the feedback loop of the drive amplifier 71. As a result, the voltage gain of the transistor is less than unity, and is has essentially zero phase shift. In consequence, the composite system voltage gain and phase shift will be essentially that of the drive amplifier 71, and is shown by the Bode Plot of FIG. 5.

The summing amplifier 86 and inverting amplifier 87 function to form a voltage-to-current converter, and thus enable the $I_C$ current at test terminal 80 to be specified by the pulsed constant current source 70. Such correlation of summing amplifier 86 with inverting amplifier 87 functions to add or subtract (depending upon the type of transistor being tested, NPN or PNP) the base current $I_B$, of test transistor 83, and test terminal 82 from the emitter lead of the transistor at test terminal 81.

Although the invention has been specifically described with reference to the measurement of $H_{FE}$ current gain of transistors, it is to be understood that the invention has other applications. For example, the test circuit of FIG. 4 can be employed for measuring base-emitter voltage, $V_{BE}$, of test transistors under conditions of specified current gain. For such a test it is only necessary to specify the $I_C$ current at test terminal 80 by the pulsed contact current source 70 and to specify the $V_{CE}$ voltage of the test transistor 83 by the constant voltage source 75, whereby the $V_{BE}$ can be directly measured across the test terminals 81 and 82.

Also the constant current pulse generator of this invention can be used independently (of the special test circuit disclosed herein) for pulsed $V_F$ tests of diodes and other semiconductors by merely specifying the forward current and measuring the forward voltage across the conducting junction.

Thus, while the invention has been particularly shown and described with reference to the preferred embodiments thereof, it will be understood by those skilled in the art that the foregoing and other various changes in form and details may be made therein without departing from the spirit and scope of the invention.

What is claimed is:

1. A test circuit for measuring forward current gain of a transistor comprising:
   a plurality of output test terminals for connection to the collector, emitter and base of said transistor;
   a first, drive, amplifier having input and output terminals;
   a resistor connected in series between the output of said first amplifier and a first of said test terminals;
   a first referenced potential connected to a second input of said first amplifier;
   a second of said test terminals connected to a second input of said first amplifier;
   a constant current generator having at least two output terminals with one generator output terminal connected to the said second test terminal and with a second generator output terminal connected to a third of said test terminals, with said second and third test terminals being adapted for connection across the emitter and collector of said transistor, and with said first test terminal being adapted for connection to the base of said transistor;
   a feedback path coupled from the said first test terminal to said second test terminal and comprising:
   a second differential, amplifier having inputs connected across said resistor;
   and means including a third inverting, amplifier having the output thereof connected to the output of said second amplifier, and with an input of said third amplifier connected to said second test terminal for applying a feedback signal to said second test terminal.

2. The test circuit of claim 1 wherein said generator is adapted to operate in the pulsed mode.

3. The test circuit of claim 1 wherein said feedback path includes a fourth, summing, amplifier with the output of said fourth amplifier connected to said second test terminal and with an input of said fourth amplifier connected to the outputs of said second and third amplifiers.

4. The test circuit of claim 3 wherein said generator is adapted to operate in the pulsed mode.

5. A test circuit for measuring current gain of a transistor comprising:
   a constant current pulse generator;
   a plurality of output test terminals with a first and a second of said test terminals connected across the input and output path of said constant current pulse generator;
   means grounding said first test terminal;
   a drive amplifier having a first input thereof connected to said second test terminal;
   a constant voltage source connected between ground and a second input of said drive amplifier;
   a resistor connected between the output of said drive amplifier and a third of said test terminals with said third test terminal adapted for connection to the base of said transistor, and said first and second test terminals adapted for connections across the collector and emitter of said transistor;
   a differential amplifier having inputs thereof connected across said resistor;
   a summing amplifier having a first grounded input and a second input connected to the output of said differential amplifier and responsive thereto;
   circuit means connecting the output of said summing amplifier to said second test terminal;
   an inverting amplifier having a first grounded input and a second input connected to said second test terminal;
   circuit means connecting the output of said inverting amplifier to the said second input of said summing amplifier; and
   voltage measuring means for measuring voltage drop across said resistor.

6. The test circuit of claim 5 wherein said voltage means is responsive to the output of said differential amplifier.

7. A constant current test circuit for measuring the $H_{FE}$ current gain of a transistor comprising:
   a constant current pulse generator;
   emitter, collector and base mounting means for operatively connecting, respectively, the emitter, collector and base electrodes of said transistor in said circuit;
   means grounding said collector mounting means;
   circuit means connecting the said emitter and collector mounting means to the output path of said pulse generator;
   a drive amplifier having a first input thereof connected to said emitter mounting means;
   a constant voltage source connected between ground and a second input of said drive amplifier;
   a resistor having a predetermined resistance connected between the base mounting means and the output of said drive amplifier;
   a differential amplifier having the inputs thereof connected across said resistor;
   a summing amplifier having a first grounded input and a second input connected to the output of said differential amplifier and responsive thereto;
   a second resistor having said predetermined resistance connected between said emitter mounting means and the output of said summing amplifier;
   an inverting amplifier having a first grounded input and a second input connected to said emitter mounting means;
   means connecting the output of said inverting amplifier to the said second input of said summing amplifier; and
   voltage measuring means for measuring the voltage drop across the first said resistor.

8. The test circuit of claim 7 wherein said voltage measuring means is responsive to the output of said differential amplifier.

* * * * *

PO-1050
(5/69)

UNITED STATES PATENT OFFICE
CERTIFICATE OF CORRECTION

Patent No. 3,622,883             Dated     11/23/71

Inventor(s)         Kenneth E. Haire

It is certified that error appears in the above-identified patent and that said Letters Patent are hereby corrected as shown below:

In Claim 1 of the Patent at line 8, change "second" to "first".

Signed and sealed this 30th day of May 1972.

(SEAL)
Attest:

EDWARD M. FLETCHER, JR.          ROBERT GOTTSCHALK
Attesting Officer                Commissioner of Patents